United States Patent [19]

Kindig et al.

[11] Patent Number: 4,611,138

[45] Date of Patent: Sep. 9, 1986

[54] HERMETIC COMPRESSOR UNIT

[75] Inventors: Alan L. Kindig; Fredus N. Peters, III, both of Holland, Mich.

[73] Assignee: General Electric Company, Fort Wayne, Ind.

[21] Appl. No.: 605,266

[22] Filed: Apr. 30, 1984

[51] Int. Cl.⁴ .............................................. A02K 11/00
[52] U.S. Cl. ...................................... 310/71; 310/157
[58] Field of Search ....................... 310/66, 67, 68, 71, 310/157

[56] References Cited

U.S. PATENT DOCUMENTS

| | | | |
|---|---|---|---|
| 2,133,985 | 10/1938 | Green | 310/71 X |
| 3,295,083 | 12/1966 | Fiore | 310/71 X |
| 3,586,910 | 6/1971 | Sauber | 310/71 X |
| 3,976,965 | 8/1976 | Remus | 310/71 X |

Primary Examiner—Donovan F. Duggan
Attorney, Agent, or Firm—Ralph E. Krisher, Jr.

[57] ABSTRACT

A hermetic compressor unit driven by a dynamoelectric machine therein adapted to be energized from a source of power has a housing with a chamber therein, and means associated with the housing and communicating with the chamber is adapted for connection with the power source. A stator of the dynamoelectric machine mounted to the housing within the chamber includes winding means having a set of lead ends integral therewith. Plug means is removably associated with the connection means for receiving the lead ends and for connecting them in circuit relation with the connection means. A set of means are associated with the lead ends of the winding means for insulating them electrically from each other with the insulating means and lead ends twisted together into a twisted bundle thereof.

6 Claims, 6 Drawing Figures

HERMETIC COMPRESSOR UNIT

CROSS-REFERENCE TO RELATED APPLICATION

This application is related to the commonly assigned application of John H. Boyd, Jr., Ser. No. 605,225 filed April 30, 1984 concurrently herewith entitled "Hermetic Compressor Unit, Stationary Assembly And Method Of Assembling Such" which is incorporated by reference herein.

FIELD OF THE INVENTION

This invention relates in general to electrical apparatus and in particular to a hermetic compressor unit.

BACKGROUND OF THE INVENTION

In the past manufacture or assembly of a stator adapted for use in a hermetic type dynamoelectric machine, windings having various different electrical and physical configurations were placed or otherwise inserted into position in the stator either manually or by utilizing various coil placement equipment well known to the art. The windings so positioned in the stator included a plurality of coils of a conductor, such as a magnet wire or the like for instance, with each coil having at least one conductor loop. The opposite side loop portions of the aforementioned conductor loops of the coils were received in winding accommodating slots provided in the stator between a pair of opposite end faces thereof, and the opposite end loop portions of such conductor loops of the coils were arranged in generally annular groupings thereof adjacent the opposite end faces of the stator, respectively. For convenience of terminating the windings when they were positioned in the stator, a plurality of conductor lead ends were brought out of the windings at only one opposite end loop grouping of the windings, and the actual number of such conductor lead ends depended, of course, upon the aforementioned electrical and physical configuration of the particular winding utilized in the stator. At this time, heavily insulated terminating leads were spliced or otherwise connected with the conductor lead ends of the windings by suitable means, such as soldering, brazing or welding or the like for instance, respectively. Upon the aforementioned splicing of the terminating leads with the conductor lead ends of the windings, the terminating leads were arranged with respect to the aforementioned one opposite end loop grouping of the windings so as to extend generally radially outwardly from an outer circumferential portion of such one opposite end loop grouping generally at a preselected location thereon, respectively. With the terminating leads so located on the one opposite end loop grouping of the windings, at least such one opposite end loop grouping was laced, and of course, the lacing generally retained the terminating leads in the located arrangement thereof on such one opposite end loop grouping, respectively. To complete the above discussed prior art assembly or manufacturing process of stator for hermetic type dynamoelectric machines, the free end portions of the terminating leads were received and terminated in a plug device of well known construction.

After the completion of the assembly of the prior art stator, as discussed above, it was found that the terminating leads extending from the one opposite end loop grouping of the windings and connected with the plug device provided a convenient "handle" which was used by many factory operators to pick up the stators in spite of admonitions against such a practice. One of the disadvantages or deleterious features of such past stator and assembly thereof is believed to be that the use of the aforementioned convenient "handle" to pick up the stator may have damaged the splice of the terminating leads with the conductor lead ends of the winding. Another disadvantageous or deleterious feature of such past stator and assembly thereof is believed to be that the splicing of the terminating leads with the conductor lead ends of the windings was time consuming and expensive thereby to increase the manufacturing cost of the stator.

SUMMARY OF THE INVENTION

Among the several objects of the present invention may be noted the provision of an improved hermetic compressor unit which overcomes the above discussed disadvantageous or undesirable features, as well as others, of the prior art; the provision of such improved hermetic compressor unit in which a set of conductor lead ends of winding means in a dynamoelectric machine adapted to drive such unit are received and terminated in a plug device therefor; the provision of such improved hermetic compressor unit in which means is associated with the conductor lead ends for insulating them electrically from each other, respectively; the provision of such improved hermetic compressor unit in which the conductor lead ends and the insulating means therefor are twisted together into a twisted bundle thereof with such twisted bundle having increased resistance to vibration effected upon the operation of such hermetic compressor unit; and the provision of such improved hermetic compressor unit which is simple in design, easily assembled and economically manufactured. These as well as other objects and advantageous features of the present invention will be in part apparent and in part pointed out hereinafter.

In general, a hermetic compressor unit in one form of the invention is driven by a dynamoelectric machine therein adapted to be energized from a source of power. The hermetic compressor unit has a housing with a hermetically sealed chamber therein, and means associated with the housing and communicating with the chamber is adapted for connection with the power source. A stator of the dynamoelectric machine is resiliently mounted to the housing within the chamber and includes winding means adapted for excitation upon the energization of the dynamoelectric machine, and a set of lead ends integral with the winding means and arranged so as to extend generally from a preselected part of the winding means, respectively. Means is removably associated with the connection means for receiving the lead ends of the winding means and for connecting them in circuit relation with the connection means, respectively. A set of means are associated with the lead ends of the winding means for insulating them electrically from each other and extend generally between the receiving and connecting means and the preselected part of the winding means, the insulating means and said lead ends being twisted together into a twisted bundle thereof, respectively.

BRIEF DESCRIPTION OF THE DRAWINGS

Corresponding reference characters refer to corresponding parts throughout the several views of the drawings.

The exemplifications set out herein illustrate a preferred embodiment of the present invention, and such exemplifications are not to be construed as limiting either the scope of the present invention or the scope of the disclosure thereof in any manner.

DETAILED DESCRIPTION OF THE PREFERRED EMBODIMENT

Figure 1:
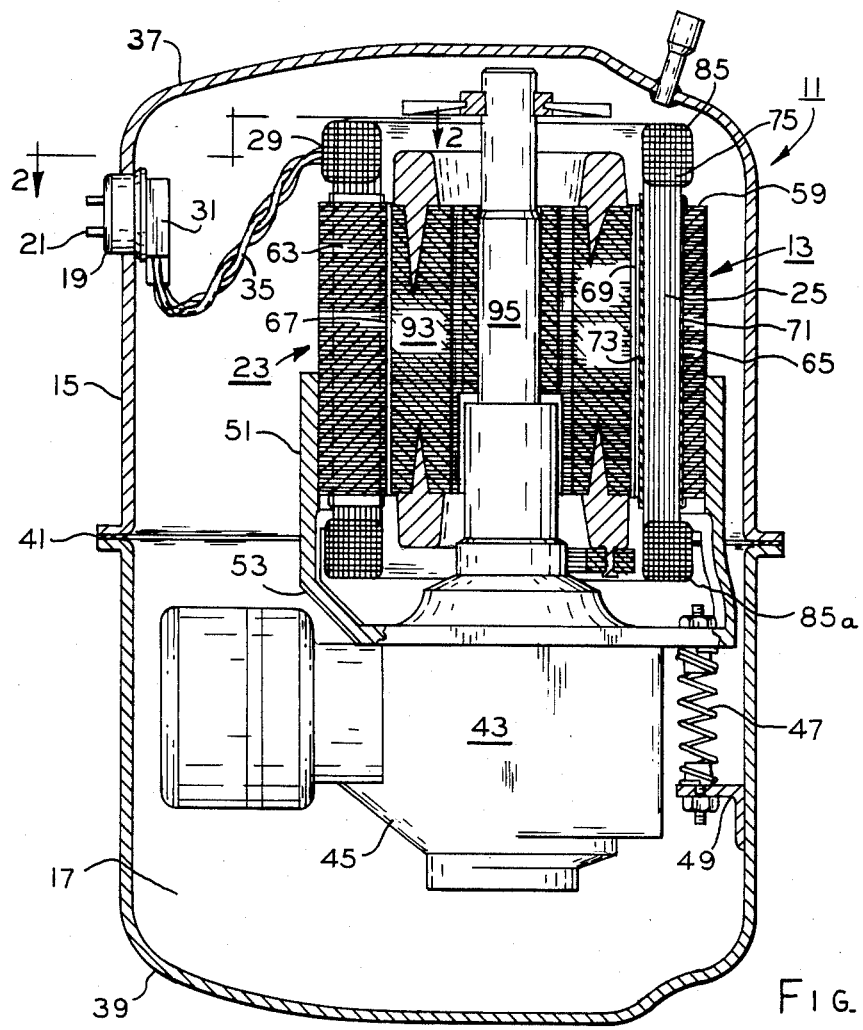
FIG. 1 is a partial sectional view illustrating a hermetic compressor unit in one form of the invention partially in cross section.
Figure 2:
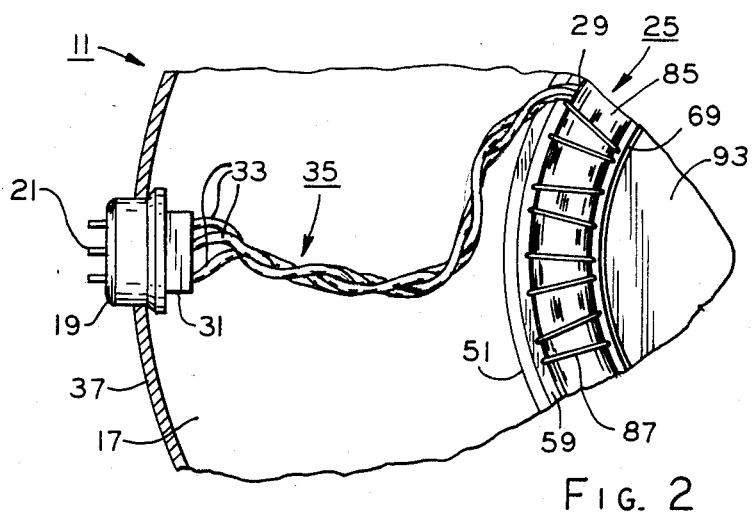
FIGS. 2 and 3 are enlarged sectional views taken along lines 2—2 and 3—3 of FIG. 1, respectively.
Figure 3:
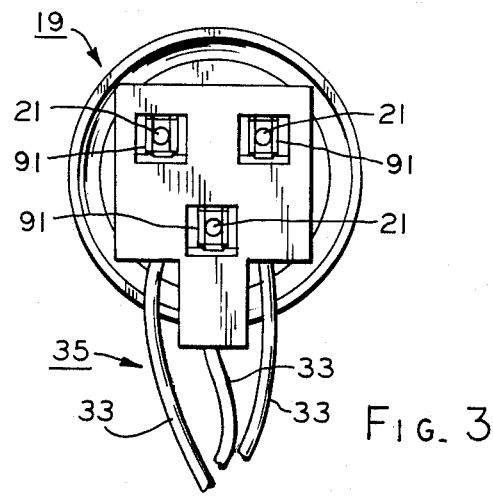
Figure 4:
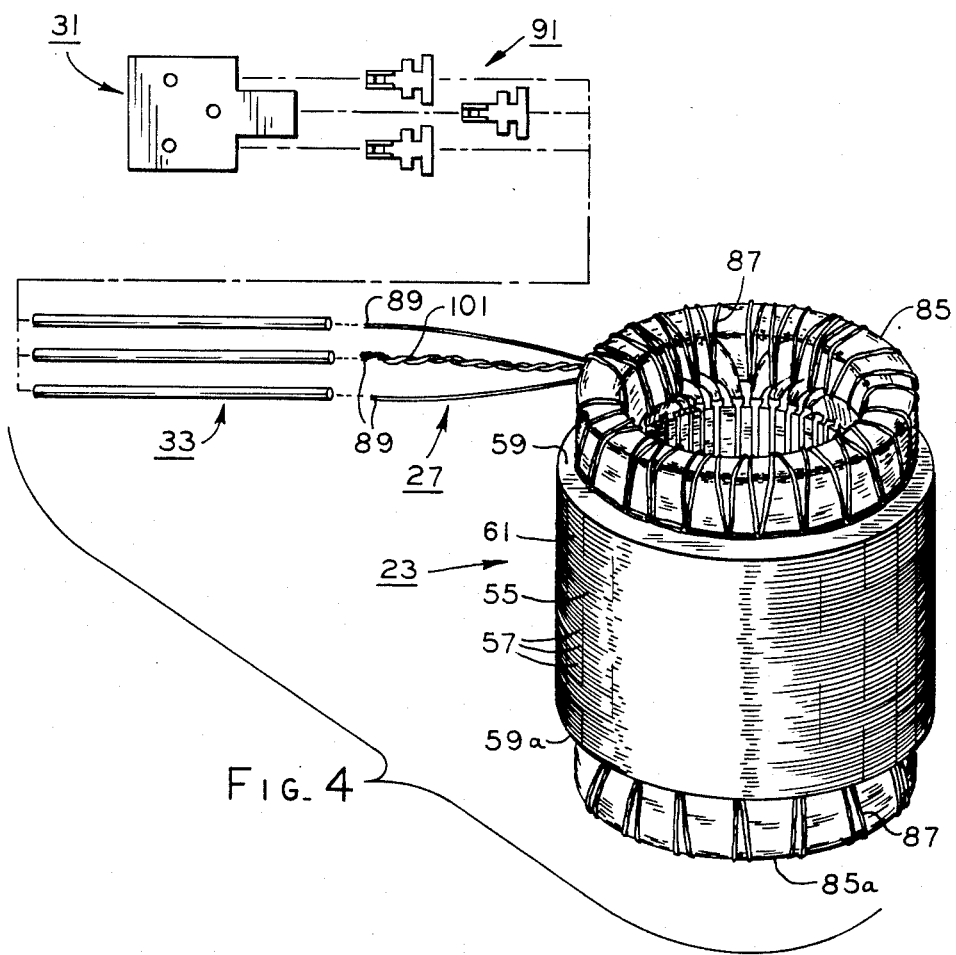
FIG. 4 is an exploded perspective view of a stator of a dynamoelectric machine illustrated in the hermetic compressor unit of FIG. 1.

With reference to the drawings in general, there is illustrated in one form of the invention a hermetic compressor unit 11 driven by a dynamoelectric machine 13 therein adapted to be energized from a source of power (not shown) (FIG. 1). Hermetic compressor unit 11 has a housing 15 with a hermetically sealed chamber 17 therein, and means, such as a Fusite plug or connection block 19 or the like for instance, associated with the housing and communicating with the chamber is adapted for connection with the power source, the connection means or Fusite plug including a set of electrical connectors or pins 21 (FIGS. 1 and 2). A stationary assembly, such as stator 23 or the like for instance, of dynamoelectric machine 13 is resiliently mounted to housing 15 within chamber 17 and includes winding means 25 adapted for excitation upon the energization of the dynamoelectric machine, and a set of lead ends or conductor lead ends 27 are integral with the winding means and arranged so as to extend from a preselected part 29 thereof, respectively (FIGS. 1, 2 and 4). Means, such as a plug member 31 or the like for instance, are removably associated with Fusite plug 19 for receiving lead ends 27 of winding means 25 and for connecting them in circuit relation with the Fusite plug (FIGS. 1-3). A set of means, such as elongate tubes 33 or the like for instance, are associated with lead ends 27 of winding means 25 for insulating them electrically from each other and extend generally between plug member or receiving means 31 and the preselected part 29 of the winding means, the insulating means or elongate tubes and the lead ends being twisted together into a twisted bundle 35 thereof, respectively (FIGS. 1 and 2).

More particularly and with specific reference to FIG. 1, housing 15 of hermetic compressor unit 11 includes upper and lower housing members 37, 39 which may be formed of any suitable metallic material, and a seal 41 is interposed between the housing members so as to hermetically seal chamber 17 therein. A hermetic compressor 43 of a type well known to the art has a casing or housing 45 disposed within chamber 17 of hermetic compressor unit housing 15, and means, such as a set of springs 47 or the like for instance, is provided for resiliently mounting both the compressor and dynamoelectric machine 13 in chamber 17. Resilient mounting means or springs 47 are biased between compressor casing 45 and a set of flanges 49 secured by suitable means, such as welding or the like, to lower housing member 39; however, for the sake of drawing simplicity only one of the aforementioned springs 47 and flanges 49 is shown. Supporting means, such as a mounting band or ring 51 or the like for instance, is engaged about an outer circumferential portion of stator 23, and a flange or flange means 53 is integrally interconnected between the mounting band and casing 45 of compressor 43 thereby to mount the stator within chamber 17 with respect to compressor 43.

Figure 5:
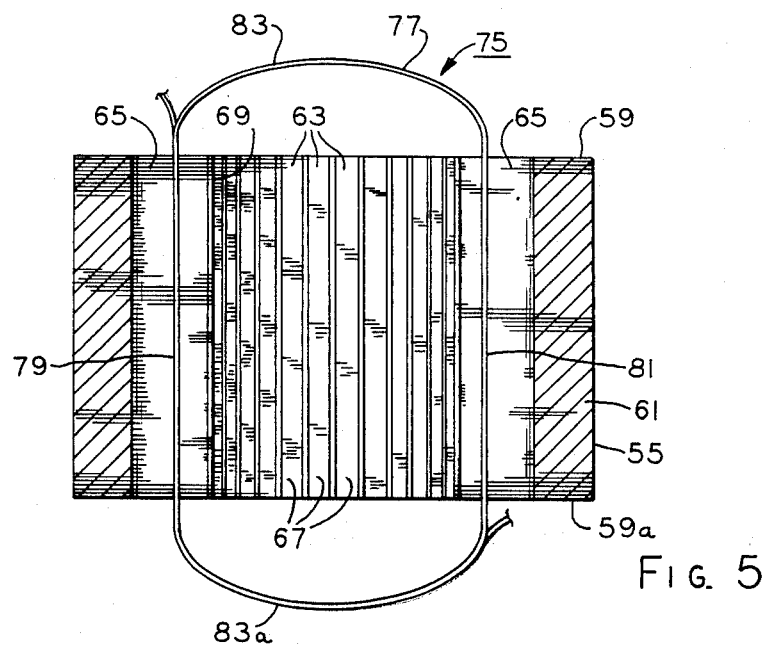
FIG. 5 is a schematic view illustrating a coil of a winding configuration of the stator of FIG. 4 with such coil having only one conductor loop associated with the stator.

Stator 23 of dynamoelectric machine 13 has a core 55 comprising a stack of laminations 57 lanced or otherwise formed from a suitable material, such as a generally thin ferromagnetic sheet material or the like for instance, and the laminations are arranged generally in surface-to-surface relation with each other so that the opposite end laminations define a pair of opposite end faces 59, 59a on the core, respectively, as also seen in FIG. 4. Albeit not shown for purposes of drawing simplicity, it is contemplated that laminations 57 of core 55 may be retained in the stack thereof against displacement by suitable means well known to the art, such as for instance welding, bonding, mechanically interlocking or cleating or the like within the scope of the invention so as to meet at least some of the objects thereof. Core 55 has a yoke section 61 defining the circumferential portion of stator 23 which is seated or received in mounting engagement by mounting band 51, as previously mentioned, and the yoke section is interposed between opposite end faces 59, 59a of the core. A plurality of generally arcuately spaced apart teeth 63 are integrally formed with yoke section 61 of core 55 and extend generally radially inwardly therefrom so as to define a plurality of winding receiving slots 65. Teeth 63 have a plurality of tips 67 on the free ends thereof defining in part a bore 69 which extends generally axially through core 55 intersecting with opposite end faces 59, 59a thereof, and winding receiving slots, of course, intersect both with the opposite end faces and the bore between adjacent ones of the tooth tips, respectively, as best seen in FIG. 5. A plurality of means, such as slot liners 71 or the like for instance, may be disposed at least in part within winding slots 65 for electrically insulating winding means 25 received therein from core 55, and another plurality of means, such as slot wedges 73 or the like for instance, may be disposed at least in part within the winding slots between adjacent ones of tooth tips 67 for retaining the winding means against displacement from the winding slots into bore 69, respectively, as well known to the art, as best seen in FIG. 1. While slot liners 71 and slot wedges 73 are shown herein for purposes of disclosure, it is contemplated that other winding insulation systems and other winding displacement preventing means may be employed with core 55 within the scope of the invention so as to meet at least some of the objects thereof. Further, it is also contemplated that other cores having configurations and constructions different than core 55, such as a core edgewise and spirally wound from a continuous strip of ferromagnetic material or the like for instance, may be utilized within the scope of the invention so as to meet at least some of the objects thereof.

Winding means 25 for stator 23 has a plurality of coils 75 formed of a conductor, such as a magnet wire having a coating of insulating material thereon as well known to the art (not shown), and such coils may be placed or otherwise associated with the stator by suitable means well known in the art, such as coil placement or injection equipment or the like for instance (not shown). When winding means 25 is associated with core 55 of stator 23, each coil 75 contains at least one conductor loop 77 with opposite side loop portions 79, 81 thereof received in slots 65 of the stator and with opposite end loop portions 83, 83a of the coils arranged in opposite generally annular groupings 85, 85a thereof adjacent opposite end faces 59, 59a of the stator, respectively. The arrangement of one conductor loop 77 of a coil 75 as received in core 55 of stator 23 is illustrated schematically in FIG. 5.

When winding means 25 is disposed in core 55 of stator 11, as discussed above, conductor lead ends 27 of the winding means are brought out of the winding means into opposite end loop grouping 85, and the aforementioned preselected part 29 of winding means 25 from which the conductor lead ends extend is, of course, on opposite end loop grouping 85 of the winding means. For purposes of disclosure, conductor lead ends 27 are illustrated herein as being brought out of winding means 25 into or through opposite end loop grouping 85 at preselected part 29 thereof generally adjacent opposite end face 59 of core 55; however, it is contemplated that such conductor lead ends may extend from opposite end loop grouping 85 at various different preselected parts or locations thereof within the scope of the invention so as to meet at least some of the objects thereof. Thus, conductor lead ends 27 are arranged with respect to opposite end loop grouping 85 of winding means 25 so as to extend generally radially outwardly beyond the outer circumference thereof, respectively. Suitable lacing twine 87 may be laced in a manner well known to the about opposite end loop groupings 85, 85a of winding means, if desired, and if a more detailed description of such lacing and/or equipment for accomplishing such lacing is desired, reference may be had to U.S. Pat. No. 3,659,337 issued May 2, 1972 to Roy E. Gawthrop et al. which is incorporated by reference herein. It is, of course, contemplated that the lacing of opposite end loop groupings 85, 85a of winding means 25 may be omitted if desired. Conductor lead ends 27 of winding means 25 may be cut or otherwise trimmed to a preselected length, if desired, which is measured generally between the cut free end portion 89 of the conductor lead ends and preselected part 29 of the winding means.

Elongate tubes 33 are formed from a suitable material compatible with a hermetic environment having desired physical and electrical insulating properties, such as Mylar or the like for instance, available from E. I. Du Pont De Nemours & Company, Wilmington, Del.; however, it is contemplated that other tubes formed of other materials may be utilized within the scope of the invention so as to meet at least some of the objects thereof. Tubes 33 are placed or otherwise positioned in insulating relation about conductor lead ends 27 so that the elongate tubes extend at least in part generally between free end portions of the conductor lead ends and preselected part 29 on opposite end loop grouping 85 of winding means 25. Depending upon the particular winding configuration of winding means 25 utilized in stator 23, it is contemplated that tubes 33 may encase each conductor lead end 27 of the winding means or that at least one such tube may encase at least two of such conductor winding leads, as discussed in greater detail hereinafter, within the scope of the invention so as to meet at least some of the objects thereof.

Upon the encasement of conductor lead ends 27 of winding means 25 with elongate tubes 33, a set of terminals 91 may be secured by suitable means well known to the art, such as crimping or soldering or the like for instance, to free end portions 89 of the conductor lead ends, and the terminals are received in a casing 93 of plug member 31 against displacement therefrom. If a more detailed discussion of plug member 31 and terminals 91 is desired, reference may be had to U.S. Pat. No. 3,764,960 issued Oct. 9, 1973 to Henry H. Heimbrock which is incorporated herein by reference; however, it is contemplated that other plug members and terminals of various different constructions may be utilized within the scope of the invention so as to meet at least some of the objects thereof.

As best seen in FIGS. 1-3, elongate tubes 33 with conductor lead ends 27 of winding means 25 encased therein are twisted together thereby to form twisted bundle 35 thereof, and in actual practice of the invention, generally about two or three full twists or turns are imparted to the elongate tubes with the conductor lead ends encased therein; however, it is believed that a greater number of such twists may be imparted to form the twisted bundle within the scope of the invention so as to meet at least some of the objects thereof. Of course, upon the formation of twisted bundle 35, the metal of conductor lead ends 27 is believed to take a memory set thereby to maintain elongate tubes 33 and the conductor lead ends encased therein at least in part generally against displacement or resilient reverse twisting of the twisted bundle thereof. It is believed that the formation of twisted bundle 35 increases the resistance thereof to vibration or vibratory movement which may be imparted thereto during the operation of hermetic compressor unit 11, as discussed hereinafter. Upon the formation of twisted bundle 35, plug member 31 is received in circuit relation or plugged onto electrical connector 21 of Fusite plug 19 in upper housing member 37 of hermetic compressor unit 11.

An inductive type rotor or rotatable member indicated generally at 93 is disposed generally coaxially within bore 69 in core 55 of stator 23, and the rotor is adapted for magnetic coupling relation with winding means 25 of the core upon the excitation thereof when dynamoelectric machine 13 is energized. Rotor 93 is secured in rotatable driving relation to a shaft 95 which is, in turn, drivingly coupled with hermetic compressor 43 to effect the operation thereof upon the energization of dynamoelectric machine 13. While dynamoelectric machine 13 is illustrated herein as an induction motor for purposes of disclosure, it is contemplated that various other types of electrical motors, such as for instance an electronically commutated motor having a permanent magnet rotor or the like, may be employed in hermetic compressor unit 11 within the scope of the invention so as to meet at least some of the objects thereof; and if more information is desired with respect to such an electronically commutated motor, reference may be had to the commonly assigned application of John H. Boyd, Jr., Ser. No. 367,951 filed April 13, 1982 (now U.S. Pat. No. 4,528,485 issued July 9, 1985) which is incorporated by reference herein.

Figure 6:
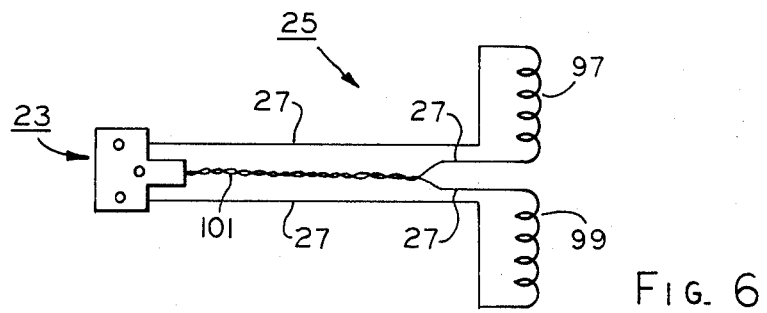
FIG. 6 is a schematic diagram of an exemplary winding which may be associated with the stator of FIG. 4 illustrating the connection of a main winding and an auxiliary winding of such exemplary winding with a plug device therefor.

An exemplary configuration of winding means 15 is schematically shown in FIG. 6 wherein the winding means comprises a main winding or main winding section 97 and an auxiliary winding or auxiliary winding section 99 each having a pair of conductor lead ends 27 brought out or extending therefrom. One of conductor lead ends 27 of each of the main winding 97 and auxiliary winding 99 are twisted or otherwise interconnected together thereby to define a common lead end 101 of winding means 25. In this winding configuration, common lead end 101 and the other conductor lead ends 27 of each of main and auxiliary windings 97, 99 are respectively encased in elongate tubes 33, terminated and associated with plug device 31, as previously discussed. While winding means 15 is illustrated herein as having main and auxiliary windings 97, 99 for purposes of disclosure, it is understood that various other winding schemes having different electrical and physical configurations and with different numbers of conductor lead ends may be utilized in dynamoelectric machine 13 within the scope of the invention so as to meet at least some of the objects thereof.

When dynamoelectric machine 13 is energized from the power source (not shown) connected with electrical connectors 21 of Fusite plug 19, the current flows therefrom through conductor lead ends 23 to effect the excitation of winding means 25. Upon the excitation of winding means 25, rotor 93 and shaft 95 are conjointly rotated in response to the magnetic coupling relation of the rotor with the winding means thereby to drivingly effect the operation of hermetic compressor 43. Of course, the operation of compressor 43 effects some vibratory movement both the compressor and dynamoelectric machine 13 mounted thereto with such vibratory movement being in part dampened by springs 47. However, it is believed that twisted bundle 35 of elongate tubes 33 with conductor lead ends 27 of winding means 25 encased therein increases the resistance of the conductor lead ends to the vibration imparted to stator 23, as discussed above, i.e., serves to dampen such vibration, thereby to preserve the integrity of the connection of plug member 31 with electrical connectors 21 of Fusite plug 19.

As previously mentioned, it is also believed that twisted bundle 35 of elongate tubes 33 with conductor lead ends 27 of winding means 25 encased therein increases the resistance of the conductor lead ends to tensile stressing thereof. For instance, during both the manufacture of dynamoelectric machine 13 and the assembly thereof into hermetic compressor unit 11, twisted bundle 35 of elongate tubes 33 with conductor lead ends 27 encased therein provides a convenient "handle" which was grasped and used by some of the operators in the factory to lift stator 23 in spite of admonitions against such a practice. Thus, the weight of stator 23 was at least for the most part suspended from twisted bundle 35 of elongate tubes 33 with conductor lead ends 27 encased therein when the twisted bundle was employed as a convenient "handle" to pick up the stator. However, it is believed that the conductor lead ends 27 demonstrate enough strength to accommodate the weight of stator 23 when twisted bundle 35 is employed as the aforementioned convenient "handle".

From the foregoing, it is now apparent that a novel hermetic compressor unit 11 is provided meeting the objects and advantageous features set out hereinbefore, as well as others, and it is contemplated that changes as to the precise arrangements, shapes, details and tions of the components utilized in such hermetic compressor unit may be made by those having ordinary skill in the art without departing from the spirit of the invention or from the scope thereof as set out in the claims which follow.

What we claim as new and desire to secure by Letters Patent of the United States is:

1. A hermetic compressor unit driven by a dynamoelectric machine therein adapted to be energized from a source of power, the hermetic compressor unit comprising:

a housing having a hermetically sealed chamber therein;

means mounted to said housing so as to extend in part therethrough and adapted for connection with the power source, said connection means including a set of electrical connectors;

a stationary assembly of said dynamoelectric machine in said chamber and including a stator having a pair of opposite end faces, a bore extending generally axially through said stator and intersecting with said opposite end faces thereof, and a plurality of winding means receiving slots intersecting with both said bore and said opposite end faces, respectively;

winding means associated with said stator and adapted for excitation upon the energization of said dynamoelectric machine, said winding means including a plurality of coils respectively formed of a conductor having a coating of dielectric material thereon and each coil having at least one conductor loop with opposite side loop portions thereof received in said slots of said stator and with opposite end loop portions arranged in opposite generally annular groupings thereof adjacent said opposite end faces of said stator, respectively, some of said coils defining a main winding of said winding means and others of said coils defining an auxiliary winding of said winding means, respectively, a pair of main winding lead ends of said conductor integral with said main winding and extending from said opposite end loop groupings of said winding means, a pair of auxiliary winding lead ends of said conductor integral with said auxiliary winding and extending from said one end loop grouping of said winding means at least generally adjacent said main winding lead ends, respectively, one of said main winding lead ends and one of said auxiliary winding lead ends being twisted together to define a common lead end of said winding means, and a set of terminals on said common lead end, the other of said main winding lead ends and the other of said auxiliary winding lead ends, respectively;

plug means for connecting said winding means in circuit relation with said connection means, said plug means including casing means for receiving said terminals and removably mounted to said electrical connectors for connecting said terminals in the circuit relation therewith, respectively;

a set of elongate tubes of a dielectric material encasing said common lead end, said other main winding lead end and said other auxiliary winding lead end and extending generally between said casing means and said one end loop grouping of said winding means, said elongate tubes with said common lead end, said other main winding lead end and said other auxiliary winding lead end encased therein being twisted together generally into a twisted bundle thereof and said common lead end, said other main winding lead end and said other auxiliary winding lead end taking a memory set so as to at least in part maintain said elongate tubes against displacement from the twisted bundle thereof, respectively;

a compressor within said chamber including means for supporting said dynamoelectric machine;

a set of means for resiliently mounting both said compressor and said dynamoelectric machine to said housing within said chamber;

a rotor of said dynamoelectric machine disposed at least in part within said bore of said stator and associated in magnetic coupling relation with said winding means upon the excitation thereof; and a shaft supporting said rotor and drivingly interconnected with said compressor.

2. A hermetic compressor unit driven by a dynamoelectric machine therein adapted to be energized from a source of power, the hermetic compressor unit comprising:

a housing having a chamber therein;

means mounted to said housing so as to extend in part therethrough into said chamber and adapted for connection with the power source;

a stator of said dynamoelectric machine in said chamber and having a pair of opposite end faces;

winding means associated with said stator and adapted for excitation upon the energization of said dynamoelectric machine, said winding means including a main winding section and an auxiliary winding section with parts thereof arranged in opposite generally annular groupings adjacent said opposite end faces of said stator, respectively, a pair of first lead ends integral with said main winding section and extending from one of said opposite annular groupings of said winding means, a pair of second lead ends integral with said auxiliary winding section and extending from said one opposite annular grouping of said winding means, one of said first lead ends and one of said second lead ends defining a common lead end of said winding means, and a set of terminals secured to said common lead end, the other of said first lead ends and the other of said second lead ends, respectively;

means associated with said connection means for receiving said terminals and for connecting them in circuit relation with said connection means, respectively;

a set of generally elongate tubes of a dielectric material encasing each of said common lead end, said other first lead end, and said other second lead end with said elongate tubes extending generally between said receiving and connecting means and said one opposite annular grouping of said winding means, said elongate tubes with said common lead end and said other first and second lead ends encased therein being twisted together into a twisted bundle thereof with said common lead end and said other first and second lead ends having a memory set imparted thereto in response to the twisting thereof so as to at least in part maintain the twist of said twisted bundle, respectively;

a rotor of said dynamoelectric machine associated with said stator and arranged in magnetic coupling relation with said winding means upon the excitation thereof;

a compressor within said chamber and including means for supporting said dynamoelectric machine;

a shaft associated with said stator and arranged in driving relation with said compressor; and a set of means associated with said housing within said chamber for resiliently mounting said compressor and said dynamoelectric machine therein; respectively.

3. A hermetic compressor unit driven by a dynamoelectric machine therein adapted to be energized from a source of power comprising:

a housing having a chamber therein;

means associated with said housing and communicating with said chamber for connection with the power source;

a stationary assembly of said dynamoelectric machine mounted to said housing within said chamber and including winding means adapted for excitation upon the energization of said dynamoelectric machine, and a set of lead ends integral with said winding means and arranged so as to extend generally from a preselected part of said winding means, respectively;

means removably associated with said connection means for receiving said lead ends of said winding means and for connecting them in circuit relation with said connection means, respectively; and a set of means associated with said lead ends of said winding means for insulating them electrically from each other and extending generally between said receiving and connecting means and said preselected part of said winding means, said insulating means and said lead ends being twisted together into a twisted bundle thereof, respectively.

4. A hermetic compressor unit as set forth in claim 3 wherein said insulating means comprise a set of elongate tubes encasing said lead ends of said winding means with said lead ends taking a memory set thereby to at least in part maintain the twist imparted to the twisted bundle, respectively.

5. A hermetic compressor unit as set forth in claim 3 further comprising a rotatable member of said dynamoelectric machine associated with said stationary assembly and arranged to rotate in magnetic coupling relation with said winding means upon the excitation thereof.

6. A hermetic compressor unit as set forth in claim 5 further comprising a compressor arranged in supporting relation with said dynamoelectric machine within said chamber and associated in driven relation with said rotatable member, and means for resiliently mounting said compressor with said housing.

* * * * *